June 23, 1964 M. A. FOLEY 3,138,479
METHOD FOR THE ELECTROLESS DEPOSITION OF HIGH COERCIVE MAGNETIC FILM
Filed Dec. 20, 1961 3 Sheets-Sheet 1
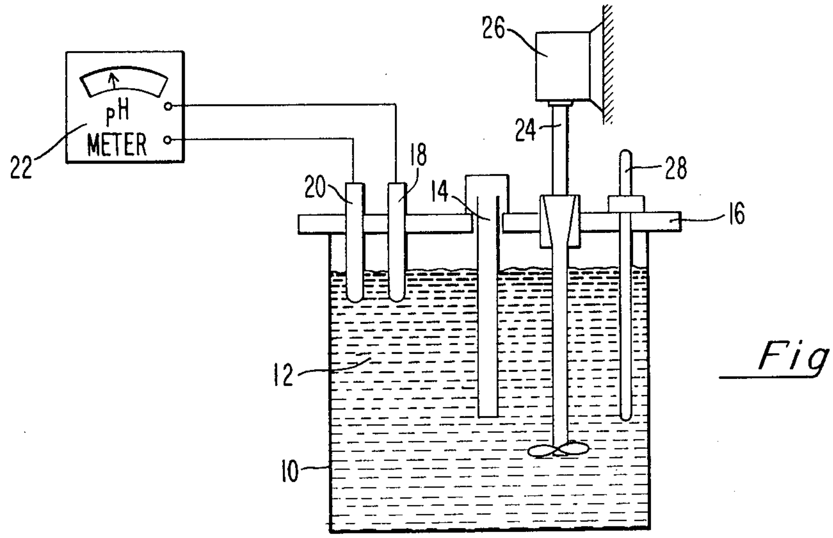
Fig. 1
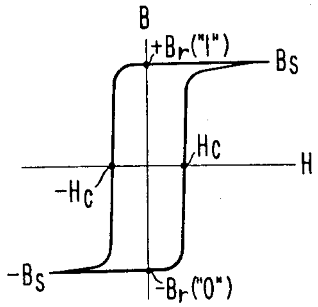
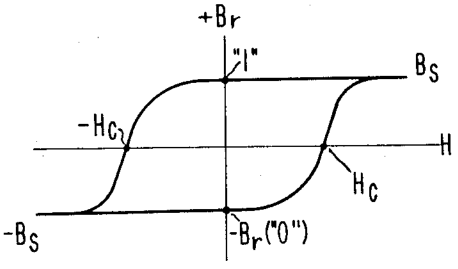
Fig. 2
Fig. 3
INVENTOR.
MARK A. FOLEY
BY James J. Wood
ATTORNEY INVENTOR.
MARK A. FOLEY
BY
James J. Wood
ATTORNEY

GLASS SUBSTRATE
THICKNESS 15 MICROINCHES

INVENTOR.
MARK A. FOLEY
BY
James J. Wood
ATTORNEY

United States Patent Office 3,138,479

Patented June 23, 1964

3,138,479

METHOD FOR THE ELECTROLESS DEPOSITION OF HIGH COERCIVE MAGNETIC FILM

Mark A. Foley, Springfield, Pa., assignor to Burroughs Corporation, Detroit, Mich., a corporation of Michigan Filed Dec. 20, 1961, Ser. No. 160,812
3 Claims. (Cl. 117—47)

This invention relates to a method for the electroless deposition of a high coercive magnetic film on a substrate.

In conventional magnetic recording there is a distribution of magnetization produced on the magnetizable medium by a recording head; it is identified by sensing the flux distribution around the recording medium. In general, in digital magnetic recording as opposed to analog magnetic recording, high volume storage is required. In this connection the bit packing density is considered a major figure of merit of a digital recording system. A bit in the binary notation of the computer art is either a "1" or a "0," which may be identified or symbolized by the remanent magnetic condition or state of square loop material, the state of positive remanence $+B_r$ being denominated a "1," and the state of negative remanence $-B_r$ being denominated a "0" or conversely.

In static memory systems such as portrayed by an array or stack of toroids, low coercive material is usually used. Here the problem of isolation is not particularly acute. In the case of high packing density however, the difficulty is two-fold. First because of the high packing density, and high packing density is defined to mean in the order of 2000 pulses per inch, there is some danger of self-demagnetization, by which is meant that the flux of one bit will fringe over and effect the next adjacent bits. Furthermore, the magnetic medium is usually in a state of motion, so that the influence of one field on another must be taken into account. Accordingly, it is desirable to use high coercive material in order that the information be unaffected by the presence of any stray or spurious magnetic fields. There are various methods available at present for the deposition of this high coercive force material. Most of them however can be divided into two grand categories: one, the electrolytic method which is limited to conductive substrates, and the other, the so-called electroless or chemical reduction technique which was discovered by Abner Brenner and Grace E. Riddell, National Bureau of Standards. In the first method a cell is actually set up with an anode and a cathode, the material to be plated serving as the cathode; with this technique obviously a potential source is required to initiate the action.

The electroless or chemical reduction technique is self-initiating and does not require any potential source. The present invention is an extension of the electroless or chemical reduction technique pioneered by Brenner and Riddell in that it investigates the various parameters involved and determines accurately the range of control for these parameters to enable the proper coercive force materials to be obtained without utilizing strictly empirical methods.

In accordance with the practice of the present invention a process is provided in which the plating bath is controlled respectively as regards: previous preparation of the substrate (if required by the nature of the substrate), initial sodium hypophosphite concentration, temperature, thickness of the deposit, the pH of the bath, and the degree of agitation.

One object of the instant invention is to provide a process whereby cobalt film of predetermined coercivity may be deposited through the control of the aforementioned parameters discretely and in combinations.

The novel features which are believed to be characteristic of the invention are set forth with particularity in the appended claims. The invention itself however, both as to its organization and method of operation together with further objects and advantages thereof may best be understood by reference to the following description taken in connection with the accompanying drawings in which:

FIG. 1 is a schematic showing of the tank containing the plating bath together with the substrate to be coated and associate control components;

FIG. 2 is a hysteresis loop showing the low coercive material used in static magnetic memory systems;

FIG. 3 is a hysteresis loop of high coercive force material required for certain digital magnetic recording techniques;

Figure 4:
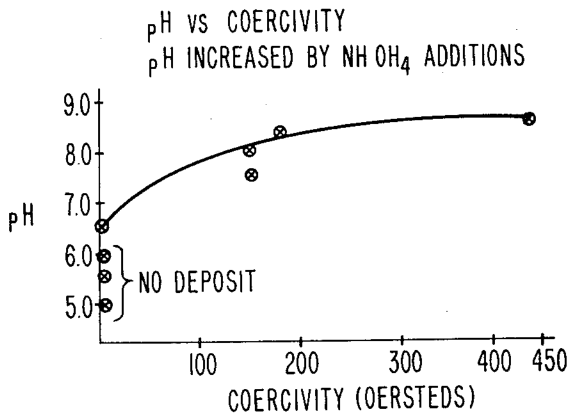
FIG. 4 is a curve showing the relationship of the bath pH to coercivity of the product in oersteds.

Referring now to FIG. 1 a suitable apparatus for the practice of this invention comprises a tank 10 which contains the plating bath 12. After preparation by sensitizing (if required), a substrate 14 to be coated is immersed in the bath 12 and is suspended from a lid 16 suitably arranged and supported in position over the bath 12 as shown. A pair of electrodes 18, 20 are also immersed in the bath and are connected to a pH meter 22. An agitator indicated generally at 24 is arranged to be energized by a suitable motor 26, also inserted into the bath. Finally, for temperature monitoring a thermometer 28 is supported from the lid 16 and is immersed in the bath.

A typical plating bath is prepared as follows: the cobalt chloride ($CoCl_2$) is dissolved in distilled water ($H_2O$). Ammonium chloride is then added; next sodium citrate ($NaC_6H_5O_7 \cdot 5H_2O$) is added. Finally sodium hypophosphite ($NaH_2PO \cdot H_2O$) is added. The resulting solution has a pH in the order of 5.2–5.4. Ammonium hydroxide is then added in sufficient amount to adjust the pH of the solution to the desired magnitude. Typical ranges for these ingredients are as follows:

| | | |
|---|---|---|
| Cobalt chloride | g./l. | 25–50 |
| Ammonium chloride | g./l. | 25–50 |
| Sodium citrate | g./l. | 50–100 |
| Sodium hypophosphite | g./l. | 10–15 |
| The temperature range | ° F. | 140–200 |
| The pH range | | 8.4–8.9 |

In one preferred embodiment the plating bath was as follows:

| | | |
|---|---|---|
| Cobalt chloride | g./l. | 35 |
| Ammonium chloride | g./l. | 50 |
| Sodium hypophosphite | g./l. | 15 |
| Temperature | ° F. | 150 |
| pH | | 8.6 |

The action of the solution in which cobalt is deposited on the substrate 14 essentially is as follows:

(1) $CoCl_2+NaH_2PO_2+H_2O \rightarrow Co+2HCl+NaH_2PO_3$ or (2) $Co^{++}+H_2PO_2^{-}+H_2O \rightarrow Co^{\circ}+2H^{+}+H_2PO_3^{-}$ Concurrently some of the hypophosphite is oxidized by the water, particularly in the presence of certain metals, to phosphite and hydrogen is liberated:

(3) $NaH_2PO_2+H_2O \rightarrow NaH_2PO_3+H_2$

Equations 1, 2 and 3 show that the reaction mixture becomes more acid as either an acid salt or free acid is produced. The reduction of cobalt ion (Equation 2) is catalyzed by certain metals, including cobalt and as cobalt is produced by the reaction it therefore is autocatalytic. This explains why the reaction which is rather slow in starting proceeds with so much vigor after it once begins.

In certain magnetic memories it is customary to utilize material having a substantially rectangular hysteresis loop wherein the applied magnetic field H and the magnetic induction B have the relationship such as shown in FIG. 2. This material is then capable of being magnetized to saturation in either of two directions ($+B_s$, $-B_s$). The respective stable states of remanence ($+B_r$, $-B_r$) upon removal of the driving magnetomotive force (M.F.) are arbitrarily denominated a "1", the positive state of residual magnetism ($+B_r$) or a "0" the negative state of residual magnetism ($-B_r$). The coercive force in each direction for such material is indicated in the drawing at $+H_c$ and $-H_c$ respectively. As will be seen from a study of FIG. 2, this material is of relatively low coercivity and is useful in devices using toroids or the like as magnetic memories.

In the practice of the instant invention it is desirable to have a hysteresis loop such as shown in FIG. 3. It will be noticed from the study of this figure that the coercivity force $H_c$ is very much greater. The reasons for this diametrically opposite requirement arises from the nature of the problem. In the environment in which the present invention is practiced it is a requirement that the binary information be of such a high bit packing density that there is danger of self-demagnetization by the stray field from adjacent bits of information; accordingly, it is therefore desirable to have a high coercive force so that these stray or spurious magnetic fields will not cause a change in retentivity of the material thereby altering the stored information. In addition, the medium used for the digital recording is usually in the form of drums, tapes and the like, which are moving in relation to the read head, and therefore the problems encountered are different from the interrogation of a stack of static fixed magnetic toroids for example, where the interrogating agency is an electric current.

In order therefore to achieve the desired objective of high coercivity magnetic material, it is necessary in the practice of the process described in connection with FIG. 1, that the various parameters be controlled. These parameters and their effect on the final product will be discussed in turn.

*Sensitizing Operation*

Some non-magnetic substrates which are autocatalytic do not require sensitizing: some alloys of aluminum, iron, cobalt, nickel, palladium, gold and the like. However, those substrates not of this class do require this prior preparation.

The sensitizing operation is concerned with the previous preparation of the substrate before immersion in the plating bath. The conductive substrates such as brass, aluminum, copper, Phosphor-bronze are prepared by immersing the substrate in a .1 to .2 g./l. solution of palladium chloride dissolved in 1% by volume solution of hydrochloric acid and distilled water for approximately 20–60 seconds, followed by rinsing with water.

In preparing non-conductive substrates such as for example, glass, polyester film or the like, the substrate is first immersed in a bath containing stannous chloride 10 g./l. in a solution of 40 c.c. per liter of hydrochloric acid for approximately one minute, followed by rinsing with water. Next the substrate is sensitized by dipping in .1 to .2 gram of palladium chloride dissolved in a 1% by volume solution of hydrochloric acid and distilled water for approximately one minute, followed by rinsing with water.

*Initial Sodium Hypophosphite Concentration*

In the initial preparation of the bath it has been found that there is little difference between 10 and 15 grams per liter concentration of the sodium hypophosphite. That is to say, very little difference is noted in the hysteresis loops that are obtained with these different concentrations. However, beyond a concentration of 15 grams per liter for example, say 20 grams per liter, the coercivity drops off considerably, and the hysteresis loop becomes unsymmetrical or skewed. This of course is an undesirable result in most applications because the skewed loop introduces a noise problem during read-back of the information.

*Temperature*

In the practice of this invention material has been deposited in the range of from 1 to 300 microinches. In one application it was desired to deposit material in the range of thickness in the order of 2 to 20 microinches. In this range it can be said that temperature has relatively little effect on the magnetic properties. Beyond the thickness range under discussion, namely, 2 to 20 microinches, temperature does have some effect on the magnetic properties, which effects include some loss in coercivity. Temperature does influence the rate of deposition, and in general the higher the temperature the faster the material will deposit. However, a lower temperature enables the process to be better controlled, one reason being that the ammonia losses are lower, and therefore the pH of the bath can be controlled in a better degree. All factors being considered, the optimum temperature of the bath should be in the order of 150° F., although the range of 140°–200° F. is satisfactory for many applications.

*Thickness*

Figure 7:
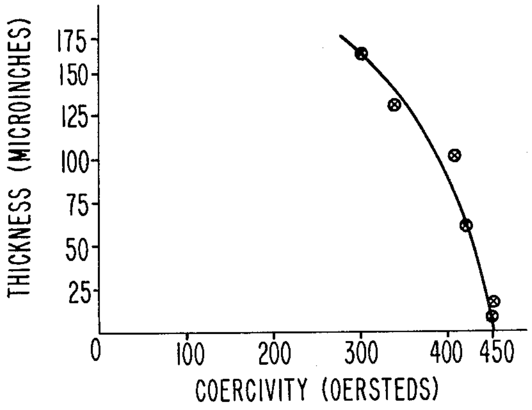
FIG. 7 is a curve showing the thickness of the plated substrate in microinches vs. the resulting coercivity in oersteds.
Figure 8:
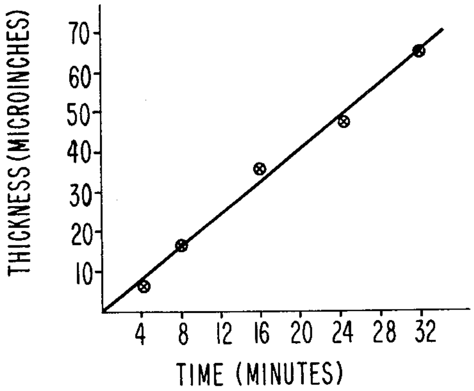
FIG. 8 is a curve showing the thickness of the substrates in microinches vs. the deposition time in minutes.

There is a direct relationship between coercivity as measured in oersteds and the thickness of the deposited film. As may be seen from a study of FIG. 7, the coercivity falls off as the film becomes thicker. In one optimum range of interest namely, 0 to 50 microinches, there is substantially no change in coercivity. Further, as may be seen from a study of FIG. 7 in the range 0–100 microinches, the loss in coercivity is 50 oersteds. FIG. 8 shows the deposition plotted as a function of time. This is a direct linear relationship and substantiates the theory that the rate of deposition is entirely uniform.

Figure 9:
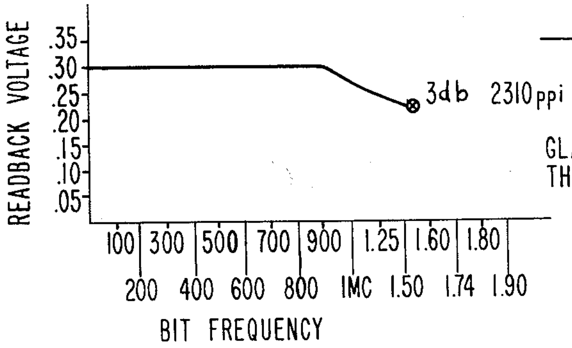
FIG. 9 is a curve showing the read-back voltages obtained vs. bit frequency, for electroless cobalt deposited on a glass substrate having a thickness of 15 microinches.

It may be well to define the bit frequency identified in FIG. 9. The bit frequency $f=P \times V$ where $f$ is the bit frequency in flux reversals per second, V is the medium surface velocity in inches per second, and P is the bit packing density in bits or flux reversals per inch.

As stated earlier, in some applications there is a requirement of high packing density so that materials of high coercivity are required. By high packing density it is meant density in the order of 2000 pulses per inch. In FIG. 9 there is shown the read-back voltages obtained from magnetic film for various bit frequencies. From 0 to 900 megacycles, the read-back voltage is substantially the same and it is only from 900 to 1.55 megacycles that there is a fall off to the 3 db point. This data was obtained with an electroless deposition of cobalt on a glass substrate having a thickness on the order of 15 microinches.

It has been found that the pulse packing density becomes lower at the 3 db point when the coercive force $H_c$ falls to 380 oersteds. Accordingly, for high packing density requirements the $H_c$ should be kept at 400 oersteds in the range 0–100 microinches; however, for certain requirements the range of 0–50 microinches will be found to be preferable.

*The pH Control*

The control of the pH of the solution of the bath has been found to be the most critical parameter. Referring now to FIG. 4, there is shown a curve of pH vs. coercivity in oersteds. A study of this curve reveals a number of very interesting facts. Below a pH in the order of 7.2 the results are fairly conclusive: either no deposition takes place or else, whatever deposition does take place, it results in so little or no coercivity so that there is very little practical use for the end product. At a pH of approximately 7.2 a noticeable change begins to take place, in the deposited film: a pH of 7.2 produces a coercivity reading in oersteds in the order of 40 to 50. An increase in pH above 7.2 shows an appreciable effect on the coercivity, increasing pH resulting in a substantial increase in coercivity. An interesting result is that at a pH of 8.6 a coercivity of approximately 450 oersteds is obtained. An increase in pH beyond 8.6, say up to 8.8 or 9 results only in an incremental change of coercivity in the order of 10–20 oersteds. The optimum range therefore appears to be 7.2 to 9 with a desirable or recommended range being in the order of 8.6 for high coercivity requirements in the order of 400 or higher oersteds. However, depending on the particular application it may very well be possible to be satisfied with a lower coercivity so that a bath having a pH of 7.2 will be satisfactory.

*Agitation*

Agitation along with the pH is one of the most important parameters. As a practical matter the degree of agitation is difficult to discuss with precision. However, some observations can be made. In general with no agitation there is a slower rate of deposition. It is very difficult to quantize the factors involved because they are myriad: for example, the geometry of the tank, the shape of the containing vessel and also the geometry of the substrate to be coated all play a part. In general, one may say that each extreme, that is, no agitation or violent agitation, is completely undesirable, no agitation resulting in extremely low coercivity, and violent agitation defeating itself, as will be explained in connection with FIG. 5.

Figure 5:
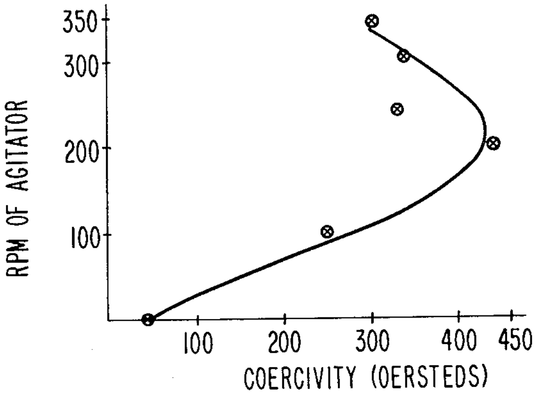
FIG. 5 is a curve used in explaining the relationship between the revolutions per minute of agitation and the coercivity in oersteds of the resulting plated substrate.

As may be seen from a study of FIG. 5, a desired coercivity in the range of 400 to 450 oersteds may be achieved with an r.p.m. agitator range of between 150 and 250 r.p.m. Any increase in agitation beyond 200 r.p.m. results in a falling off of coercivity.

Figure 6:
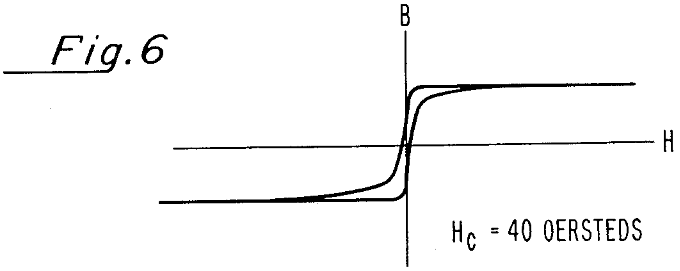
FIG. 6 is a hysteresis loop showing the type of B–H curve obtained when there is no agitation of the bath under certain conditions.

As previously stated, no agitation at all produces some undesirable results. A hysteresis loop produced by no agitation is shown in FIG. 6. However, one interesting thing has been noted—if a brass substrate is bright dipped in a 90–10 phosphoric-nitric acid solution for ten seconds prior to deposition, then the entire situation is reversed and a completely normal hysteresis loop may then be obtained without agitation.

The resulting product—the coated substrate—is ready to use without any further processing, i.e., heat treating or annealing. This makes for simplification of the process in addition to insuring the probability of more uniform magnetic properties.

Further, heretofore high coercivity was generally obtained by the electrolytical deposition of films from cobalt nickel alloys. Fluctuation in the composition of the alloys utilized adversely affected the magnetic properties. However, in the process described herein there is only one major magnetic element or compound in the bath so that the probability of obtaining reliable, uniform magnetic properties is greatly enhanced.

Obviously, many modifications and variations of the present invention are possible in the light of the above teachings. It is therefore to be understood that within the scope of the appended claims the invention may be practiced other than as specifically described and illustrated.

What is claimed is:

1. The process for producing a thin magnetic coating of cobalt having a coercivity of 400 to 450 oersteds on a non-conductive, non-magnetic, non-catalytic substrate by means of electroless plating in an aqueous electroless plating bath of cobalt chloride 25–50 g./l., ammonium chloride 25–50 g./l., sodium citrate 50–100 g./l., and sodium hypophosphite comprising the critical control of each of the following steps:

(*a*) immersing said substrate in a bath containing stannous chloride 10 g./l. in a solution of 40 cc./l. of hydrochloric acid for approximately one minute, follower by rinsing with water;
(*b*) sensitizing the substrate by dipping said substrate in .1 to .2 gram of palladium chloride dissolved in 1% by volume solution of hydrochloric acid and distilled water for approximately one minute, followed by rinsing with water;
(*c*) establishing the initial concentration of the hypophosphite ion in said electroless plating bath by adding sodium hypophosphite in the range of 10–15 g./l.;
(*d*) maintaining the temperature of said electroless plating bath in the range of 140–200° F.;
(*e*) controlling the pH of said electroless plating bath in the range from 8.4 to 8.9;
(*f*) mildly agitating said electroless plating bath;
(*g*) depositing cobalt on the substrate immersed in said electroless plating bath in a thickness of from 1 to 100 microinches whereby the coercive force of the deposited material will be in the range from 400 to 450 oersteds.

2. The process for producing a thin magnetic coating of cobalt having a coercivity of 400–450 oersteds on a conductive, non-magnetic, non-catalytic surface by means of electroless plating in an aqueous solution of cobalt chloride 25–50 g./l., ammonium chloride 25–50 g./l., sodium citrate 50–100 g./l., and sodium hypophosphite comprising the critical control of each of the following steps:

(*a*) sensitizing the substrate by dipping said substrate in .1 to .2 gram of palladium chloride dissolved in 1% by volume solution of hydrochloric acid and distilled water for approximately one minute, followed by rinsing with water;
(*b*) establishing the initial concentration of the hypophosphite ion in said electroless plating bath by adding sodium hypophosphite in the range of 10–15 g./l.;
(*c*) maintaining the temperature of said electroless plating bath in the range of 140–200° F.;
(*d*) controlling the pH of said electroless plating bath in the range from 8.4 to 8.9;
(*e*) mildly agitating said electroless plating bath;
(*f*) depositing cobalt on the substrate immersed in said electroless plating bath in a thickness of from 1 to 100 microinches whereby the coercive force of the deposited material will be in the range from 400 to 450 oersteds.

3. The process for producing a thin magnetic coating of cobalt having a coercivity of 400–450 oersteds on a conductive, non-magnetic auto-catalytic surface by means of electroless plating in an aqueous solution of cobalt chloride 25–50 g./l., ammonium chloride 25–50 g./l., sodium citrate 50–100 g./l., and sodium hypophosphite comprising the critical control of each of the following steps:

(*a*) establishing the initial concentration of the hypophosphite ion in said electroless plating bath by adding sodium hypophosphite in the range of 10–15 g./l.;
(*b*) maintaining the temperature of said electroless plating bath in the range of 140–200° F.;
(*c*) controlling the pH of said electroless plating bath in the range from 8.4 to 8.9;
(*d*) mildly agitating said electroless plating bath;
(*e*) depositing cobalt on the substrate immersed in said electroless plating bath in a thickness of from 1 to 100 microinches whereby the coercive force of the deposited material will be in the range from 400 to 450 oersteds.

References Cited in the file of this patent

UNITED STATES PATENTS

| | | |
|---|---|---|
| 2,532,283 | Brenner et al. | Dec. 5, 1950 |
| 2,532,284 | Brenner et al. | Dec. 5, 1950 |
| 2,566,676 | Rabbitts | Sept. 4, 1951 |
| 2,702,253 | Bergström | Feb. 15, 1955 |
| 2,900,282 | Rubens | Aug. 18, 1959 |
| 2,968,578 | Mochel | Jan. 17, 1961 |
| 3,011,920 | Shipley | Dec. 5, 1961 |
| 3,041,198 | Certa | June 26, 1962 |

OTHER REFERENCES

Tsu: IBM Technical Disclosure Bulletin, vol. 2, No. 3, October 1959.

Koretzky: IBM Technical Disclosure Bulletin, vol. 4, No. 1, June 1961.

Brenner et al.: "Deposition of Nickel and Cobalt by Chemical Reduction," Journal of Research of the National Bureau of Standards, Research Paper RP 1835, vol. 39, pp. 385–395, November 1947.

Symposium on Electroless Nickel Plating, published by ASTM, 1959, pp. 23, 28 and 29.

Koretzky: IBM Technical Disclosure Bulletin, vol. 5, No. 2, p. 59, July 1962.

Tsu et al.: IBM Technical Disclosure Bulletin, vol. 4, No. 8, p. 52, January 1962.

Koretzky: IBM Technical Disclosure Bulletin, vol. 4, No. 1, p. 18, June 1961.